Figure 1:
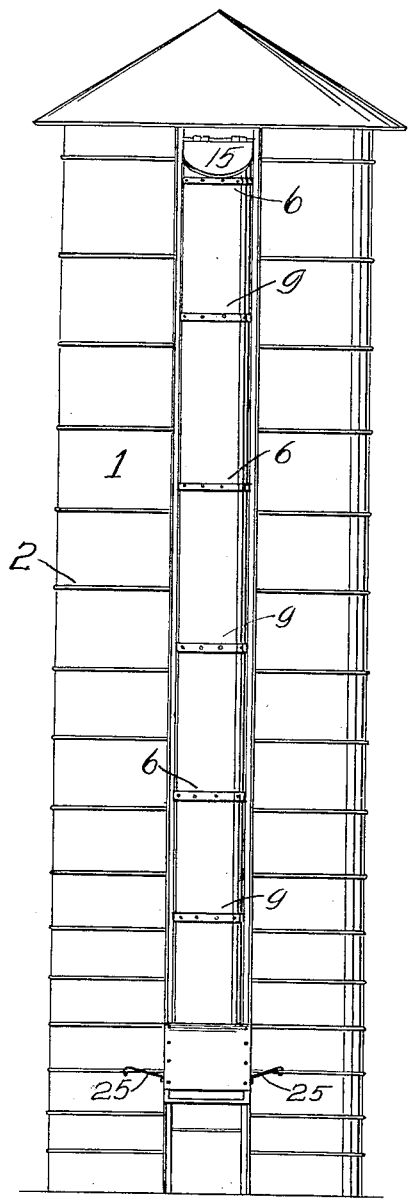

J. H. LATIMER.
SILO CHUTE.
APPLICATION FILED APR. 7, 1913.

1,094,726. Patented Apr. 28, 1914.
2 SHEETS—SHEET 1.

WITNESSES
John Cook,
Edna V. Crawford.

J. H. LATIMER
INVENTOR
By Parker Cook
Attorney

J. H. LATIMER.
SILO CHUTE.
APPLICATION FILED APR. 7, 1913.
1,094,726.
Patented Apr. 28, 1914.
2 SHEETS—SHEET 2.
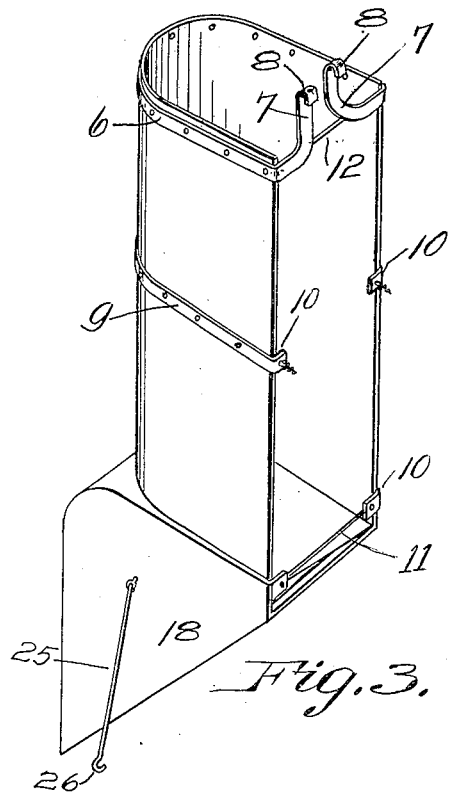
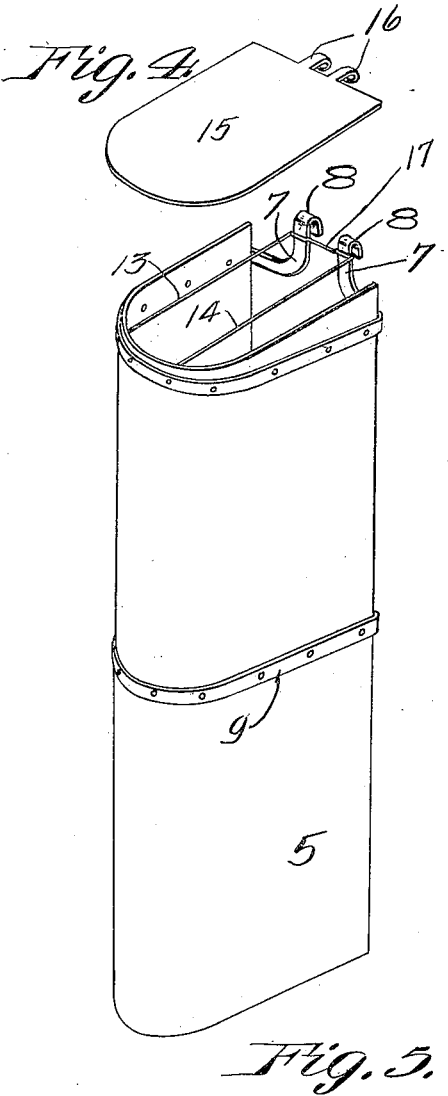
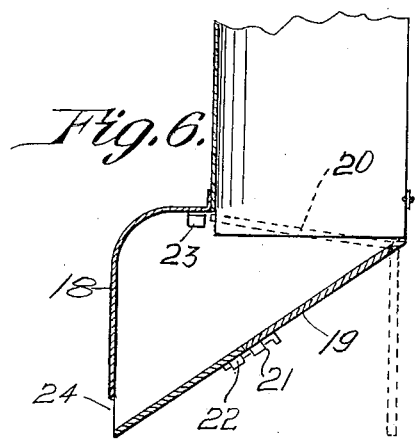
WITNESSES
John Cook
Edna V. Crawford.
J. H. LATIMER
INVENTOR
Parker Cook
Attorney

UNITED STATES PATENT OFFICE.

JAMES H. LATIMER, OF WEINERT, TEXAS.

SILO-CHUTE.

1,094,726.

Specification of Letters Patent.

Patented Apr. 28, 1914.

Application filed April 7, 1913. Serial No. 759,353.

*To all whom it may concern:*

Be it known that I, JAMES H. LATIMER, a citizen of the United States, and a resident of Weinert, in the county of Haskell and State of Texas, have made and invented certain new and useful Improvements in Silo-Chutes, of which the following is a specification.

My invention relates to a new and useful improvement in chutes for unloading ensilage and more particularly to chutes that are especially adapted for use with silos.

A primary object of the invention is to produce a chute that may be readily attached to or detached from a silo.

Another object is to provide a chute that may be increased or decreased in length in accordance with the height of the particular silo to which the same is to be attached.

Still another object is to provide a chute that will be comparatively light in weight, yet sufficiently strong for all its purposes; one that may be crated for shipment in sections thereby utilizing as small a space as possible; one that will be cheap to manufacture, and easy to construct.

With these and other objects in view my invention relates to the novel construction and combination of parts as will be hereinafter more fully described; illustrated in the drawings and pointed out in the claims.

Figure 2:
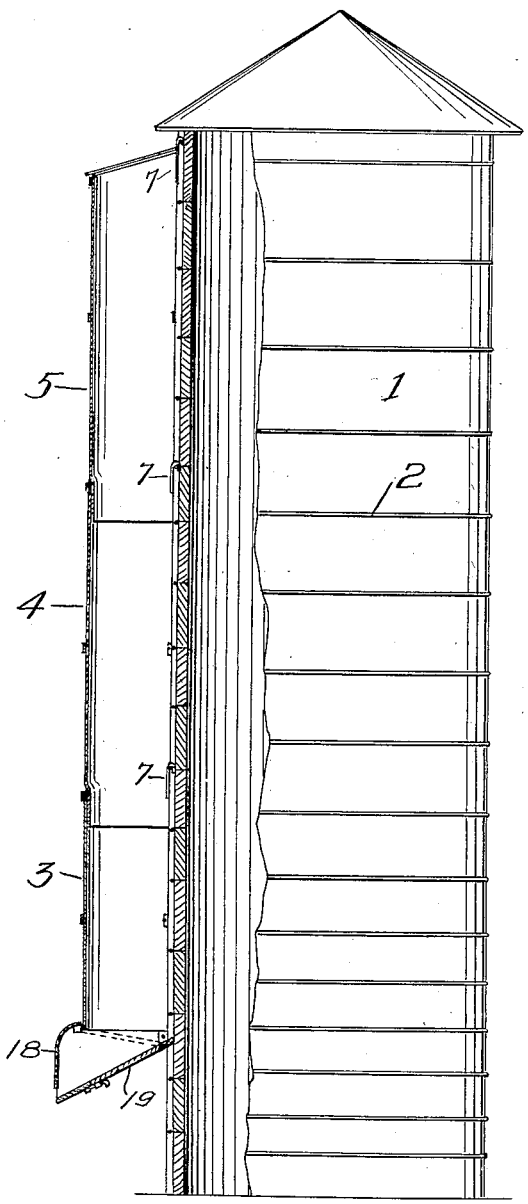

In the drawings forming a part of this application and in which like numerals of reference designate corresponding parts throughout the several views; Figure 1 is a front view in elevation of a silo with the chute attached; Fig. 2 is a side view in elevation, partly in section of the silo and the attached chute; Fig. 3 is a perspective view of the lower section; Fig. 4 is a perspective view of the door or cover for the top of the upper section; Fig. 5 is also a perspective view of the top section; Fig. 6 is a cross sectional view of the lower portion of the chute as shown in Fig. 3.

Referring to the drawings the silo 1 is shown as of the usual cylindrical form and of course of any practical height and clamping hoops 2 of the usual form are shown and extend across the door openings (not shown) as is the usual construction of modern silos.

It will be understood that the silo *per se* forms no part of the invention but is simply shown so that the manner of attaching my improved chute will be readily understood. If my improved chute is to be attached to a silo wherein the hoops do not cross the door openings it will of course be seen that hoops or rings may be placed on the silo over the top of the door openings.

As shown in Fig. 2 my improved chute is preferably formed in sections although without further illustration it will be seen that it would be possible to construct the chute in a single section although numerous advantages appear where the chute is constructed from a number of sections.

As shown in the above mentioned figure three sections are generally employed a lower section 3, a central section 4, and an upper section 5 although as many central sections or intermediate sections may be used as may be found necessary. The sections may be made of wood though preferably of metal, such as tin, galvanized iron, etc., as not only when the sections are made of metal are they much lighter than if made of wood but will naturally withstand the ill effects of weather. As shown in Fig. 3 and Fig. 5 the sections are preferably formed U shape in cross section and the adjacent ends adapted to fit one within the other. (See Fig. 2). At or near the upper end of each section is a metal band 6 extending completely around the same and terminating at the rear in two vertically extending arms 7, which are in turn bent downwardly forming hooks 8.

The metal band 6 is securely fastened to the chute in any well known manner as by bolts, rivets, etc., and it will be seen that these bands not only hold the chute in its proper shape or form but also form the hooks before mentioned that secure or detachably hold the chute to the silo. For the further strengthening or retaining each of the sections of the chute in their proper shape or form, bands 9 are provided which are fastened similarly to the bands 6 and are also similar in form except that they terminate at the rear of the sections in inwardly projecting arms 10 and are secured to the silo with bolts or lag screws. As many of these bands may be used as found necessary. One is always provided however at the lower end of the lower section (Fig. 3) and connected by a rod or wire 11. A rod or wire 12 is also shown in Fig. 3 connected to the opposite sides of the chute in a plane with the band 6 as this prevents the bulging of the chute when the end of the central section is inserted. Again at the upper end of section 5 are brace rods 13 and 14 extending from the central portion of the U to the arms 7 for the purpose of securely bracing the same and which also help support the door or cover 15 which is provided with the lips 16 which are adapted to engage the member 17 of the brace rods 13 and 14.

Referring now to Figs. 3 and 6 there is shown securely fastened to the lower end of the section 3 and made a part thereof what I term a delivery spout 18 which may be of any desirable shape, form or thickness but preferably substantially triangular in cross section and is provided on its under side with a hinged door 19, this door serving a double function, that of providing an entrance to the spout 18 and also when raised as shown in dotted line 20. to cut off the flow of ensilage. This door 19 is provided with a bolt 21 and the under portion of the delivery spout is provided with two eyes 22 and 23 so that the door may be securely retained or fastened in either position. The opening 24 at the end of the spout is of course for the delivery of the ensilage. Of course this may be in any shape or form desired and the height of the opening may be made as large as found necessary. Two rods 25 are pivotally secured to the sides of the delivery spout 18 and I have shown their ends formed in the shape of hooks 26 which are adapted to retain the section 3 against the silo. To assemble the chute and attach the same to the silo the lower end of the section 4 is placed within the section 3 and the lower end of section 5 placed within the upper end of section 4 and it will be readily seen and understood that the length of the chute may not only be increased or decreased by the number of sections employed but may be changed to some extent by the telescopic action of the sections this action being only limited by the distance of the bands 9 from the bands 6. To attach the same to the silo the chute is placed opposite the doors of the silo, Fig. 1, and the hooks 8 of each section passed over the hoops 2 and the hoops 26 also fastened to the hoops 2.

From the foregoing it will be seen that the chute is simple in construction that the length may be greatly varied by the number of sections employed and varied to a lesser extent by telescoping the sections and if desired as the ensilage decreases in the silo the chute may be lessened in length, also by having the chute in sections the same may be varied to suit the distance according to the distance that the clamping hoops are placed apart or in other words the distance between hoops on a silo may vary and it is necessary to have the hooks on the chute register with them. It will also be seen that the chute may be readily fastened to the silo and if for any reason it is desired to detach the same it may be readily accomplished and by forming the chute in sections as already pointed out it may be readily attached to any sized silo. Further by providing a door as illustrated and pointed out in the under portion of the feed spout access may be readily gained to the delivery spout to clean the same and with the same door the flow of ensilage may be stopped at any time.

Although the forms of the invention herein shown and described are what are believed to be the preferable embodiment thereof it is nevertheless understood that the same may change as to proportions and details without in any way departing from the scope and spirit of the invention.

Having thus described my invention what I claim as new and desirable to secure by Letters Patent is:—

1. A silo chute comprising a plurality of telescopic sections, a circumscribing band secured to each of said sections, the ends of said bands being bent inwardly and then upwardly and then downwardly to form vertical gripping arms and adapted to detachably secure the said sections to the hoops of a silo.

2. A silo chute comprising a plurality of telescopic sections, an encircling band secured to each of said sections terminating in the rear thereof in the form of gripping arms, adapted to detachably engage the hoops of a silo and a second band encircling each of said sections, and means for securing the ends of said band to the silo.

3. A silo chute comprising a plurality of telescopic sections, a band secured to each of said sections, the ends of said band being bent inwardly and upwardly and then downwardly to form vertical gripping arms and adapted to detachably secure said sections to the hoops of a silo.

4. A silo chute comprising a plurality of telescopic sections, said sections being U shaped in cross sections, a circumscribing band secured to each of said sections, the ends of said band being bent inwardly and then upwardly and then downwardly to form vertical gripping arms and adapted to detachably secure the said sections to the hoops of a silo, a second band circumscribing each of said sections and means for securing the ends of the latter to a silo.

5. A silo chute comprising an upper section provided with a circumscribing band terminating in vertical gripping arms in the rear thereof, a brace rod secured to said gripping arms and extending to the front of said section, and a door pivoted to that part of the brace rod extending between the said arms.

6. A silo chute comprising a lower section, and means for retaining the upper portion thereof in engagement with the hoops of a silo, a delivery spout secured to the lower end of said section, means for retaining said spout in engagement with the hoops of a silo, a door in the lower portion of said delivery spout and adapted to be raised to thereby close the lower end of the chute.

7. A silo chute comprising a lower section, means for retaining the said section in engagement with the hoops of a silo, a delivery spout secured to the lower end of said section said delivery spout being substantially triangular in cross section, a door in the under portion of said delivery spout and adapted to be raised and lowered, and means for retaining the door in its upper and lower position.

Signed at Weinert, in the county of Haskell and State of Texas, this 20th day of March A. D. 1913.

JAMES H. LATIMER.

Witnesses:
W. L. LONVILLE,
D. L. MAXWELL.

Copies of this patent may be obtained for five cents each, by addressing the "Commissioner of Patents, Washington, D. C."